US012675013B2

(12) United States Patent
Zhao et al.

(10) Patent No.: US 12,675,013 B2
(45) Date of Patent: Jul. 7, 2026

(54) DISPLAY BACKLIGHT INCLUDING OPTICAL FILM HAVING A TRANSMISSION PEAK WAVELENGTH GREATER THAN AN EMISSSION PEAK WAVELEGNTH OF THE BACKLIGHT

(71) Applicant: 3M INNOVATIVE PROPERTIES COMPANY, St. Paul, MN (US)

(72) Inventors: Lin Zhao, Woodbury, MN (US); Gilles J. Benoit, Minneapolis, MN (US); Bharat R. Acharya, Woodbury, MN (US); Robert D. Taylor, Stacy, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 19/108,609

(22) PCT Filed: Sep. 8, 2023

(86) PCT No.: PCT/IB2023/058932
§ 371 (c)(1),
(2) Date: Mar. 4, 2025

(87) PCT Pub. No.: WO2024/062333
PCT Pub. Date: Mar. 28, 2024

(65) Prior Publication Data
US 2026/0003228 A1      Jan. 1, 2026

Related U.S. Application Data

(60) Provisional application No. 63/407,765, filed on Sep. 19, 2022.

(51) Int. Cl.
*G02F 1/13357*          (2006.01)

(52) U.S. Cl.
CPC .. *G02F 1/133606* (2013.01); *G02F 1/133621* (2013.01)

(58) Field of Classification Search
CPC ......... G02F 1/133606; G02F 1/133621; G02F 1/133603; G02F 1/1335; G02B 5/0278;
(Continued)

(56) References Cited

U.S. PATENT DOCUMENTS 5,882,774 A      3/1999   Jonza et al.
9,158,155 B2   10/2015   Weber
(Continued)

FOREIGN PATENT DOCUMENTS

WO      2018163009 A1      9/2018
WO      2021224760 A1     11/2021
(Continued)

OTHER PUBLICATIONS

International Search Report for PCT International Application No. PCT/IB2023/058932, mailed on Nov. 14, 2023, 4 pages.

*Primary Examiner* — Ismael Negron
(74) *Attorney, Agent, or Firm* — Clifton F. Richardson

(57)          ABSTRACT

A backlight includes an illumination system having a plurality of light sources configured to emit at least red light from an emission surface, and an optical film having pluralities of first and second layers separated by at least one spacer layer. The emitted light includes a red light having a first red peak wavelength with a full width at 70% maximum FWr1. The optical film is configured such that, for a substantially normally incident light and for a first polarization state, an optical transmittance of the optical film versus wavelength has a first red-infrared transmittance peak at a first red-infrared peak wavelength of greater than about 600 nm with a red-infrared full width at 70% maximum FWri1, (Continued)

with the red-infrared peak wavelength being greater than the red peak wavelength by at least 10 nm, and $FWri1/FWr1 \geq 7$.

15 Claims, 12 Drawing Sheets

(58) Field of Classification Search
   CPC ....... G02B 5/0273; G02B 5/0294; F21S 9/08;
                                                    F21S 9/40
   See application file for complete search history.

(56)                    References Cited

U.S. PATENT DOCUMENTS

| | | | | |
|---|---|---|---|---|
| 11,126,034 B2 * | 9/2021 | Jiang | .................. | G02F 1/13338 |
| 11,402,708 B2 * | 8/2022 | Huang | ................. | H10F 39/806 |
| 11,776,300 B2 * | 10/2023 | Kim | .................. | G06V 40/1318 |
| 11,921,372 B2 * | 3/2024 | Chang | ............... | G02F 1/133603 |
| 12,013,553 B2 * | 6/2024 | Yamada | ................. | G02B 30/25 |
| 12,126,337 B2 * | 10/2024 | Liu | .......................... | G09G 5/10 |
| 2012/0293742 A1 | 11/2012 | Banerjee | | |
| 2015/0378077 A1 | 12/2015 | Haag et al. | | |
| 2017/0108672 A1 * | 4/2017 | Chang | .................... | G02B 5/208 |
| 2017/0124376 A1 * | 5/2017 | Wyrwas | ............... | G06V 10/143 |
| 2018/0314096 A1 * | 11/2018 | Yang | .................... | G06F 1/1684 |
| 2020/0409218 A1 * | 12/2020 | Tsai | ................... | G02F 1/13338 |
| 2022/0058360 A1 * | 2/2022 | Zhang | ............... | G02F 1/133603 |
| 2023/0204839 A1 * | 6/2023 | Stover | .................... | B32B 27/08 |
| | | | | 359/352 |
| 2025/0321368 A1 * | 10/2025 | Long | ...................... | G02B 5/208 |

FOREIGN PATENT DOCUMENTS

| | | | |
|---|---|---|---|
| WO | 2021224799 A1 | 11/2021 | |
| WO | 2022079507 A1 | 4/2022 | |
| WO | 2022137060 A1 | 6/2022 | |

* cited by examiner

DISPLAY BACKLIGHT INCLUDING OPTICAL FILM HAVING A TRANSMISSION PEAK WAVELENGTH GREATER THAN AN EMISSSION PEAK WAVELEGNTH OF THE BACKLIGHT

CROSS REFERENCE TO RELATED APPLICATIONS

This application is a national stage filing under 35 U.S.C. 371 of PCT/IB2023/058932, filed Sep. 8, 2023, which claims the benefit of U.S. Application No. 63/407,765, filed Sep. 19, 2022, the disclosure of which are incorporated by reference in their entireties herein.

TECHNICAL FIELD

The present disclosure relates generally to an optical film, and in particular, to a display system and a backlight including the optical film.

BACKGROUND

Typically, backlights may provide illumination to a display panel configured to display an image on display devices, such as handheld devices. Nowadays, the display panels of the handheld devices may require functionalities, such as a under display fingerprint sensing functionality. However, use of prism films in the display devices may distort a fingerprint image and may negatively affect the under display fingerprint sensing functionality.

SUMMARY

In a first aspect, the present disclosure provides a backlight for providing an illumination to a display panel configured to display an image. The backlight includes an illumination system configured to emit a light from an emission surface thereof. The emitted light includes at least a red light including a red emission spectrum including a first red emission peak at a first red peak wavelength with a red full width at 70% maximum $FWr1$. The backlight further includes an optical film disposed on red light emitting elements. The optical film includes at least one spacer layer disposed between a plurality of first layers and a plurality of second layers. The first and second layers number at least 10 in total. Each of the first and second layers has an average thickness of less than about 500 nm. Each of the at least one spacer layer has an average thickness of at least about 5 microns. For a substantially normally incident light and for at least a first polarization state, an optical transmittance of the optical film versus wavelength has a first red-infrared transmittance peak at a first red-infrared peak wavelength of greater than about 600 nm with a red-infrared full width at 70% maximum $FWri1$. The red-infrared peak wavelength is greater than the red peak wavelength by at least 10 nm, and $FWri1/FWr1 \geq 7$.

In a second aspect, the present disclosure provides a backlight for providing an illumination to a display panel configured to display an image. The backlight includes an illumination system configured to emit a light from an emission surface thereof. The emitted light includes at least a red light including a red emission spectrum including a first red emission peak at a first red peak wavelength with a red full width at 70% maximum $FWr1$. The backlight further includes an optical film disposed on red light emitting elements. The optical film includes at least one spacer layer disposed between a plurality of first layers and a plurality of second layers. The first and second layers number at least 10 in total. Each of the first and second layers has an average thickness of less than about 500 nm. Each of the at least one spacer layer has an average thickness of at least about 5 microns. For an incident light incident on the optical film at an incident angle of greater than about 15 degrees and for at least a first polarization state, an optical transmittance of the optical film versus wavelength has a first red-infrared transmittance peak at a first red-infrared peak wavelength greater than about 600 nm with a red-infrared full width at 50% maximum $FW'2$. The red-infrared full width at 50% maximum $FW'2$ of the first red-infrared peak wavelength fully encompasses the red full width at 70% maximum $FWr1$ of the first red peak wavelength. Further, $FW'2/FWr1 \geq 2$.

In a third aspect, the present disclosure provides an optical film including at least one spacer layer disposed between a plurality of first layers and a plurality of second layers. The first and second layers number at least 50 in total. Each of the first and second layers has an average thickness of less than about 500 nm. Each of the at least one spacer layer has an average thickness of at least about 5 microns. A scatter plot of layer thickness versus layer number for at least 30 sequentially arranged and numbered first and second layers in the pluralities of first and second layers includes a first group of scatter points and a remaining group of scatter points separated along a thickness direction. The scatter points in the first and remaining groups lie on respective substantially straight first and second lines. When the optical film is disposed on a substantially Lambertian light source that emits light having respective blue, green, and red emission spectra including respective blue, green, and red peaks with respective blue, green, and red full width at 70% maximums $FWb1$, $FWg1$ and $FWr1$, respectively, where $FWb1$ is greater than $FWr1$ by at least a factor of 2 and $FWg1$ is greater than $FWr1$ by at least a factor of 5, then the optical film transmits the emitted light with a color shift of the transmitted light with respect to the light emitted and as a function of a transmitted angle in a plane substantially perpendicular to the optical film, having a main color shift peak at a transmission angle of less than about 10 degrees and a color shift plateau region that is at least 5 degrees wide and lies at transmission angles of greater than about 2 degrees. The main color shift peak has a full width at 80% maximum of greater than about 1 degree, and the color shift across the color shift plateau region varying with a standard deviation of less than about 0.5.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
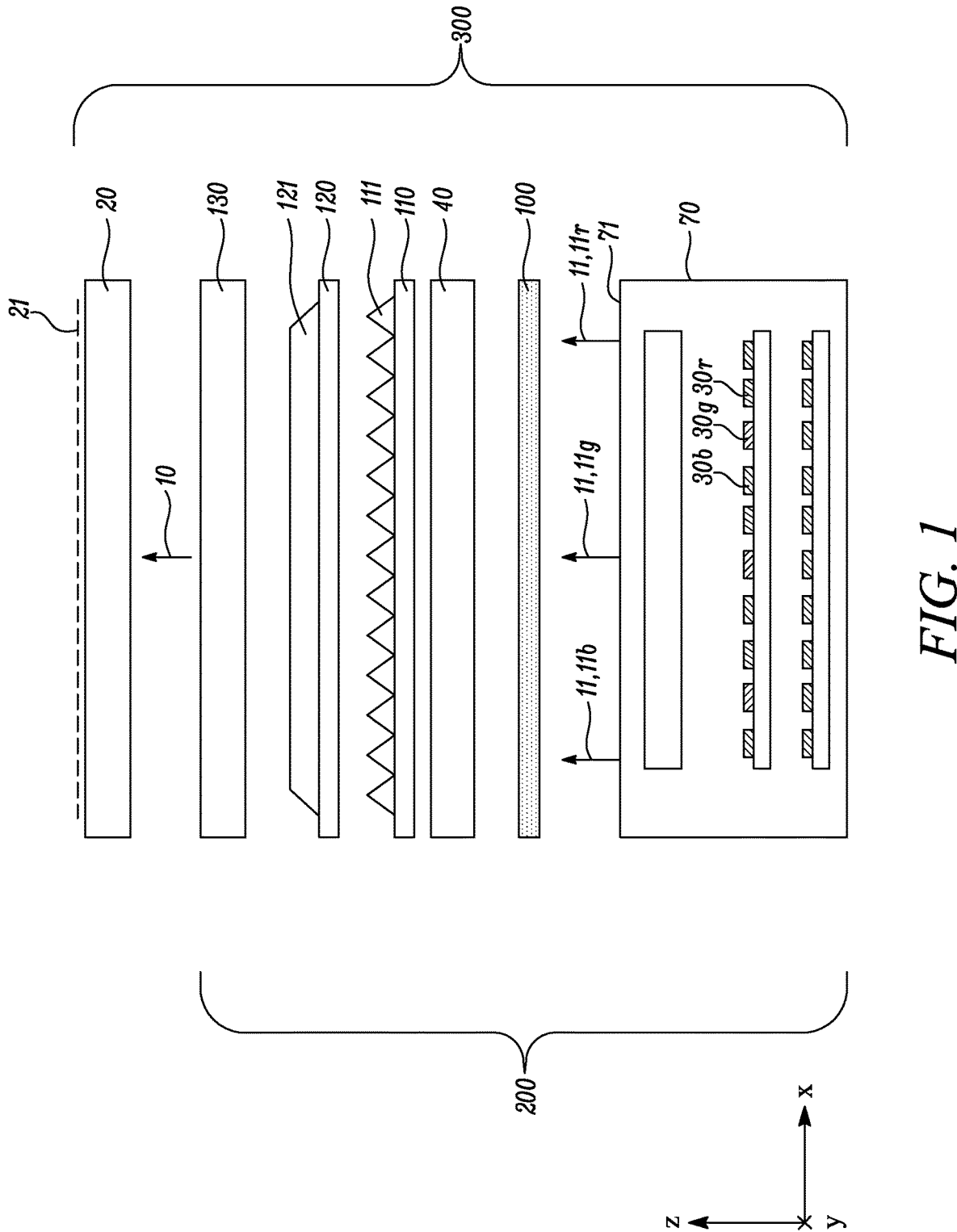
FIG. 1 shows a schematic sectional exploded view of a display system, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

As used herein, the term "band edge" refers to a portion of an optical transmission spectrum where there is a substantially steady increase in an optical transmission or a substantially steady decrease in the optical transmission.

Typically, backlights may provide illumination to a display panel configured to display an image on display devices, such as handheld devices. Nowadays, the display panels of the handheld devices may require functionalities, such as a under display fingerprint sensing functionality. To enable the under display fingerprint sensing functionality, backlights with infrared transmissive properties and with collimating functionalities may be required. However, use of prism films in the backlight of the display devices may distort a fingerprint image and may negatively affect the under display fingerprint sensing functionality. Therefore, in some cases, infrared transmissive collimating films may be used to enable the under display fingerprint sensing functionality while enhancing a brightness of the display panel.

Nowadays, high color gamut light-emitting diode (LED) sources are widely used in liquid-crystal display (LCD) display devices. The high color gamut LED sources typically have several sharp emission peaks compared to conventional LED sources. However, the infrared transmissive collimating films may induce a severe color artifact when used with the high color gamut LED sources. Specifically, the sharp emission peaks of the high color gamut LED sources may align with spectral ringing in transmission spectra of the infrared transmissive collimating films and may result in a color band artifact. Therefore, the infrared transmissive collimating films may not be compatible with the high color gamut LED sources.

Therefore, a suitable solution may be required which may enable the under display fingerprint sensing functionality while being compatible with the high color gamut LED sources. Specifically, a solution may be required which may provide the infrared transmissive and collimating functionalities while reducing or preventing the severe color artifacts when used with the high color gamut LED sources.

The present disclosure relates to an optical film compatible with an illumination system to form a backlight for providing illumination to a display panel configured to display an image. The present disclosure further relates to a display system including the display panel disposed on the backlight. The display system may be a handheld device with under display fingerprint sensing functionality.

The backlight includes an illumination system configured to emit a light from an emission surface thereof. The emitted light includes at least a red light including a red emission spectrum including a first red emission peak at a first red peak wavelength with a red full width at 70% maximum FWr1. The backlight further includes an optical film disposed on red light emitting elements. The optical film includes at least one spacer layer disposed between a plurality of first layers and a plurality of second layers. The first and second layers number at least 10 in total. Each of the first and second layers has an average thickness of less than about 500 nm. Each of the at least one spacer layer has an average thickness of at least about 5 microns. For a substantially normally incident light and for at least a first polarization state, an optical transmittance of the optical film versus wavelength has a first red-infrared transmittance peak at a first red-infrared peak wavelength of greater than about 600 nm with a red-infrared full width at 70% maximum FWri1. The red-infrared peak wavelength is greater than the red peak wavelength by at least 10 nm, and FWri1/FWr1≥7.

Therefore, the first red-infrared transmittance peak and the first red emission peak of the red light may not overlap with each other. Any substantial overlap between the first red-infrared transmittance peak and the first red emission peak of the red light may otherwise cause spectral ringing and may induce severe color artifacts. Hence, the backlight including the optical film of the present disclosure may provide the infrared transmissive and collimating functionalities while reducing or preventing the severe color artifacts.

Referring now to figures, FIG. 1 is a schematic sectional exploded view of a display system 300, according to an embodiment of the present disclosure.

The display system 300 defines mutually orthogonal x, y, and z-axes. The x and y-axes are in-plane axes of the display system 300, while the z-axis is a transverse axis disposed along a thickness of the display system 300. In other words, the x and y-axes are disposed along a plane of the display system 300, while the z-axis is perpendicular to the plane of the display system 300.

The display system 300 includes a display panel 20 configured to display the image 21. The display panel 20 may include various elements, such as an electroluminescent panel, an incandescent or a phosphorescent light source, a cathode ray tube (CRT), light emitting diodes (LEDs), lenses, collimators, reflectors, and/or polarizers. In some embodiments, the display panel 20 may include a liquid crystal display (LCD) panel. The image 21 can be substantially monochromatic, polychromatic, narrow band, or broad band, but preferably overlaps at least a portion of the visible spectrum.

The display system 300 further includes a backlight 200 for providing an illumination 10 to the display panel 20 configured to display the image 21. The display panel 20 is disposed on the backlight 200 and is configured to receive the illumination 10 from the backlight 200 and display the image 21.

The backlight 200 includes an illumination system 70. The illumination system 70 includes red light emitting elements 30r. In some embodiments, the illumination system 70 further includes blue light emitting elements 30b and green light emitting elements 30g. In the illustrated embodiment of FIG. 1, the illumination system 70 has a backlit configuration. In some embodiments, the illumination system 70 may include high color gamut LED light sources. For example, the blue light emitting elements 30b, the green light emitting elements 30g, and the red light emitting elements 30r may include high color gamut LED light sources. The illumination system 70 is configured to emit a light 11 from an emission surface 71 thereof. In the illustrated embodiment of FIG. 1, the emitted light 11 of the illumination system 70 includes a blue light 11b, a green light 11g, and a red light 11r. Specifically, the blue light 11b is emitted by the blue light emitting elements 30b, the green light 11g is emitted by the green light emitting elements 30g, and the red light 11r is emitted by the red light emitting elements 30r.

The backlight 200 further includes an optical film 40 disposed on the red light emitting elements 30r. In the illustrated embodiment of FIG. 1, the optical film 40 is disposed on the blue, green, and red light emitting elements 30b, 30g, 30r.

In some embodiments, the backlight 200 further includes an optical diffuser 100 disposed between the optical film 40 and the illumination system 70 for at least one of diffusing and redirecting the light 11 incident thereon.

In some embodiments, the backlight 200 further includes a first prismatic film 110 disposed on the optical film 40 opposite the illumination system 70 and including a plurality of first prisms 111 extending along substantially a same first longitudinal direction. In some embodiments, the backlight 200 further includes a second prismatic film 120 disposed on the first prismatic film 110 opposite the optical film 40 and including a plurality of second prisms 121 extending along substantially a same second longitudinal direction different from the first longitudinal direction. However, in some other embodiments, the backlight 200 does not include any prismatic films for redirecting and recycling the light 11.

The plurality of first prisms 111 of the first prismatic film 110 may be substantially similar to the plurality of second prisms 121 of the second prismatic film 120. In the illustrated embodiment of FIG. 1, the pluralities of first and second prisms 111, 121 include triangular prisms. However, in some other embodiments, the pluralities of first and second prisms 111, 121 may include prisms of different shapes. In the illustrated embodiment of FIG. 1, the first longitudinal direction is substantially along the y-axis and the second longitudinal direction is substantially along the x-axis. In some embodiments, the first and second longitudinal directions are substantially orthogonal to each other.

In some embodiments, the backlight 200 further includes a reflective polarizer 130 disposed on the optical film 40 opposite the illumination system 70. Specifically, in the illustrated embodiment of FIG. 1, the reflective polarizer 130 is disposed between the display panel 20 of the display system 300 and the second prismatic film 120 of the backlight 200.

As discussed above, the display panel 20 is configured to receive the illumination 10 from the backlight 200. In the illustrated embodiment of FIG. 1, the display panel 20 receives the illumination 10 from the reflective polarizer 130 of the backlight 200.

Figure 2:
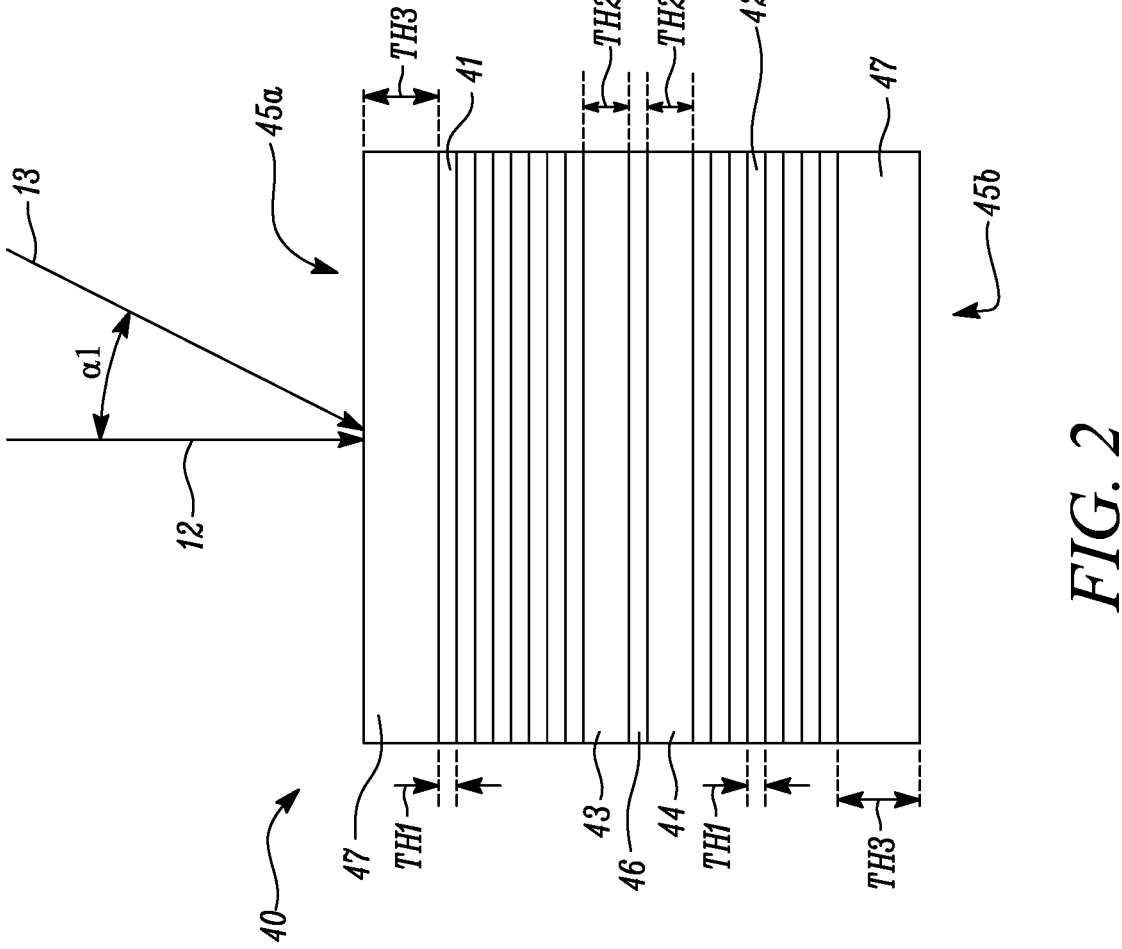
FIG. 2 shows a schematic sectional view of an optical film of the display system, according to an embodiment of the present disclosure.
Figure 2:
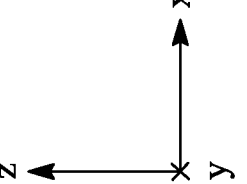

FIG. 2 illustrates a schematic sectional view of the optical film 40, according to an embodiment of the present disclosure.

The optical film 40 has one side 45a and an opposite side 45b. The optical film 40 includes at least one spacer layer 43, 44 disposed between a plurality of first layers 41 and a plurality of second layers 42. In the illustrated embodiment of FIG. 2, the optical film 40 includes two spacer layers 43, 44 disposed between the plurality of first layers 41 and the plurality of second layers 42. However, in some other embodiments, the optical film 40 may include any number of spacer layers 43, 44 disposed between the plurality of first layers 41 and the plurality of second layers 42.

The first and second layers 41, 42 number at least 10 in total. In some embodiments, the first and second layers 41,

42 number at least 25, at least 50, at least 100, at least 200, at least 300, at least 400, at least 500, or at least 600 in total. In some embodiments, the at least one spacer layer 43, 44 and the first and second layers 41, 42 are co-extruded and co-stretched.

In some embodiments, each of the first and second layers 41, 42 has an average thickness TH1 of less than about 500 nanometers (nm). The term "average thickness", as used herein, refers to an average of thicknesses measured at multiple points across a plane (i.e., the x-y plane) of each of the first and second layers 41, 42. In some embodiments, each of the first and second layers 41, 42 has the average thickness TH1 of less than about 400 nm, less than about 300 nm, or less than about 200 nm.

In some embodiments, each of the at least one spacer layer 43, 44 has an average thickness TH2 of at least about 5 microns. The term "average thickness", as used herein, refers to an average of thicknesses measured at multiple points across a plane (i.e., the x-y plane) of each of the at least one spacer layers 43, 44. In some embodiments, each of the at least one spacer layer 43, 44 has the average thickness TH2 of at least about 10 microns, at least about 15 microns, at least about 20 microns, at least about 25 microns, at least about 30 microns, at least about 35 microns, at least about 40 microns, at least about 45 microns, or at least about 50 microns.

In the illustrated embodiment of FIG. 2, the optical film 40 further includes an intermediate layer 46 disposed between the spacer layers 43, 44. However, in some other embodiments, the optical film 40 may not include any intermediate layer disposed between the spacer layers 43, 44.

In some embodiments, the optical film 40 further includes at least one skin layer 47 having an average thickness TH3 of greater than about 500 nm. In some embodiments, the at least one skin layer 47 has the average thickness TH3 of greater than about 750 nm, greater than 1000 nm, greater than about 1500 nm, or greater than about 2000 nm. In the illustrated embodiment of FIG. 2, the optical film 40 includes two skin layers 47. The at least one skin layer 47 may protect the first and second layers 41, 42, and may also provide mechanical stability to the optical film 40. In some cases, the at least one skin layer 47 may act as protective boundary layer (PBL).

In some embodiments, the optical film 40 is configured to receive a substantially normally incident light 12. In some embodiments, the optical film 40 receives an incident light 13 at an incident angle α1 of greater than about 15 degrees. In the illustrated embodiment of FIG. 2, the optical film 40 receives the incident light 13 at the incident angle α1 of about 30 degrees. In some embodiments, the incident angle α1 is greater than about 20 degrees, greater than about 25 degrees, or greater than about 30 degrees.

Figure 3:
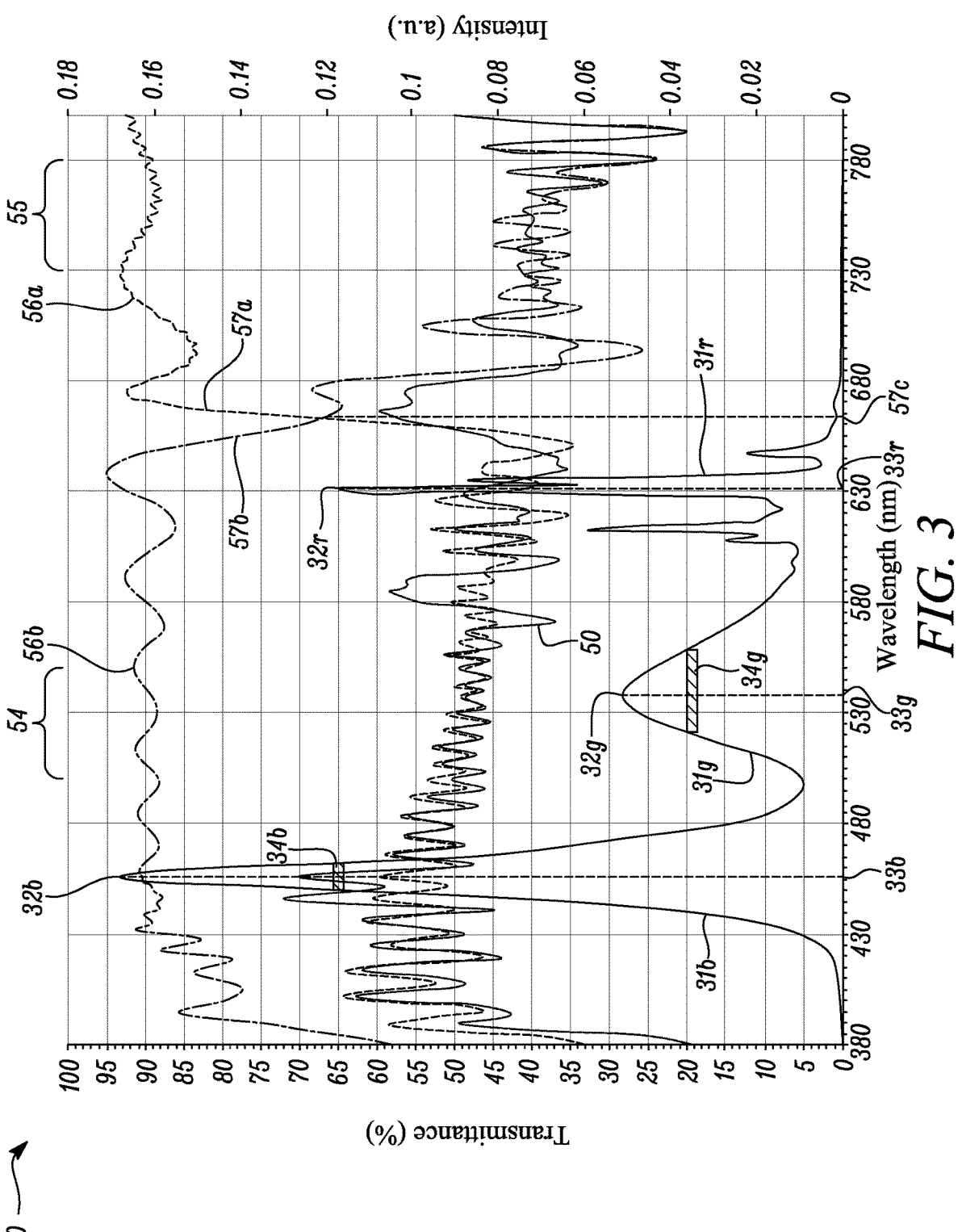
FIG. 3 shows a graph depicting optical transmittances of the optical film and each of pluralities of first and second layers of the optical film versus wavelength for a substantially normally incident light and for a first polarization state, according to an embodiment of the present disclosure.
Figure 4:
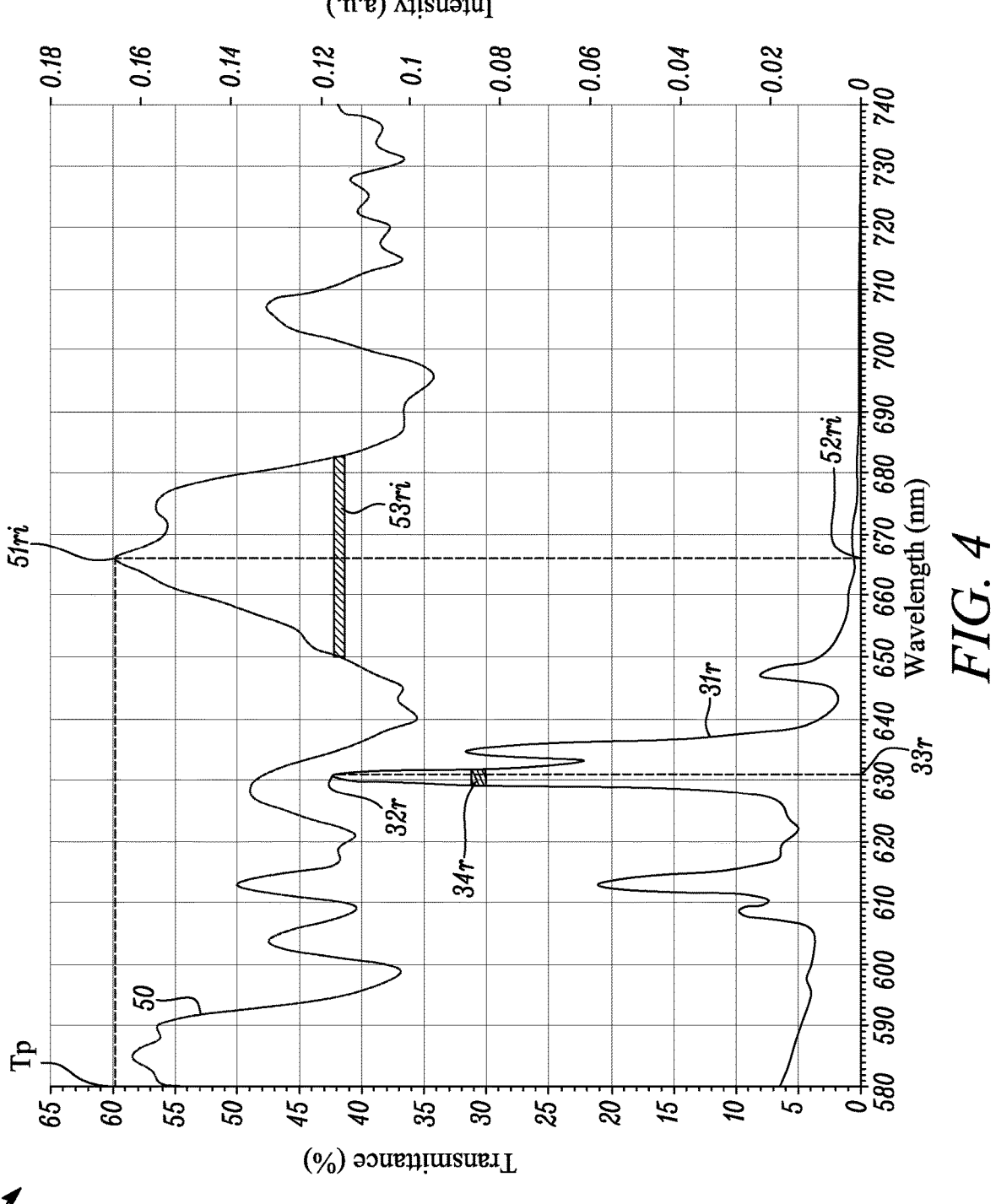
FIG. 4 shows a magnified view of a portion of the graph of FIG. 3.

FIGS. 3 and 4 illustrate a graph 400 depicting an optical transmittance of the optical film 40 (shown in FIG. 2) versus wavelength, according to an embodiment of the present disclosure. Specifically, FIG. 4 illustrates a magnified view of the graph 400 for wavelengths from 580 nm to 740 nm. In particular, the graph 400 depicts the optical transmittance of the optical film 40 versus wavelength for the substantially normally incident light 12 (shown in FIG. 2) and for at least a first polarization state. In some embodiments, the at least the first polarization state is along the x-axis. In some other embodiments, the at least the first polarization state is along the y-axis.

The graph 400 further depicts an optical transmittance versus wavelength of each of the pluralities of first and second layers 41, 42 (shown in FIG. 2). Wavelength is expressed in nanometers (nm) in abscissa. The optical transmittance is expressed as a transmittance percentage in the left ordinate, while the emission intensity is expressed in arbitrary units (a.u.) in the right ordinate. The emission intensity in arbitrary units corresponds to emission spectra 31*b*, 31*g*, 31*r* of the emitted light 11 (shown in FIG. 1) emitted by the illumination system 70 (shown in FIG. 1).

The graph 400 includes a curve 50 depicting the optical transmittance of the optical film 40, a curve 56*a* depicting the optical transmittance of the plurality of first layers 41, and a curve 56*b* depicting the optical transmittance of the plurality of second layers 42. In the illustrated embodiment of FIG. 4, some components of the graph 400 (such as the curves 56*a*, 56*b*) are not shown for illustrative purposes.

Referring to FIGS. 1 to 4, as discussed above, the illumination system 70 is configured to emit the light 11 from the emission surface 71 thereof. The emitted light 11 includes at least the red light 11*r* including the red emission spectrum 31*r* including a first red emission peak 32*r* at a first red peak wavelength 33*r* with a red full width at 70% maximum FWr1 34*r* (shown in FIG. 4). The red full width at 70% maximum FWr1 is denoted by 34*r* in FIG. 4.

In the illustrated embodiment of FIGS. 3 and 4, the first red peak wavelength 33*r* of the first red emission peak 32*r* is about 631 nm, and the red full width at 70% maximum FWr1 32*r* is about 3 nm.

In some embodiments, the emitted light 11 from the emission surface 71 of the illumination system 70 further includes the blue light 11*b* having the blue emission spectrum 31*b* including a first blue emission peak 32*b* at a first blue peak wavelength 33*b* with a blue full width at 70% maximum FWb1 34*b*. In the illustrated embodiment of FIG. 3, the first blue peak wavelength 33*b* of the first blue emission peak 32*b* is about 455 nm and the blue full width at 70% maximum FWb1 34*b* is about 12 nm. The blue full width at 70% maximum FWb1 is denoted by 34*b* in FIG. 3.

In some embodiments, the emitted light 11 from the emission surface 71 of the illumination system 70 further includes the green light 11*g* having the green emission spectrum 31*g* including a first green emission peak 32*g* at a first green peak wavelength 33*g* with a green full width at 70% maximum FWg1 34*g*. In the illustrated embodiment of FIG. 3, the first green peak wavelength 33*g* of the first green emission peak 32*g* is about 538 nm and the green full width at 70% maximum FWg1 34*g* is about 38 nm. The green full width at 70% maximum FWg1 is denoted by 34*g* in FIG. 3.

In some embodiments, each of the blue full width at 70% maximum FWb1 34*b* and the green full width at 70% maximum FWg1 34*g* is greater than the red full width at 70% maximum FWr1 34*r* by at least a factor of 2. In some embodiments, each of the blue full width at 70% maximum FWb1 34*b* and the green full width at 70% maximum FWg1 34*g* is greater than the red full width at 70% maximum FWr1 34*r* by at least a factor of 2.5, at least a factor of 3, at least a factor of 3.5, or at least a factor of 4.

In some embodiments, the green full width at 70% maximum FWg1 34*g* is greater than the red full width at 70% maximum FWr1 34*r* by at least a factor of 5. In some embodiments, the green full width at 70% maximum FWg1 34*g* is greater than the red full width at 70% maximum FWr1 34*r* by at least a factor of 6, at least a factor of 7, at least a factor of 8, at least a factor of 9, or at least a factor of 10.

As depicted by the curve 50, for the substantially normally incident light 12 and for the at least the first polarization state, the optical transmittance of the optical film 40 versus wavelength has a first red-infrared transmittance peak $51ri$ at a first red-infrared peak wavelength $52ri$ of greater than about 600 nm with a red-infrared full width at 70% maximum FWri1 $53ri$. The red-infrared full width at 70% maximum FWri1 is denoted by $53ri$ in FIG. 4. In some embodiments, the first red-infrared peak wavelength $52ri$ is greater than about 610 nm, greater than about 620 nm, greater than about 630 nm, greater than about 640 nm, greater than about 650 nm, or greater than about 660 nm. In the illustrated embodiment of FIGS. 3 and 4, the first red-infrared peak wavelength $52ri$ is about 666 nm and the red-infrared full width at 70% maximum FWri1 $53ri$ is about 32 nm.

The first red-infrared peak wavelength $52ri$ is greater than the first red peak wavelength $33r$ by at least 10 nm. In some embodiments, the first red-infrared peak wavelength $52ri$ is greater than the first red peak wavelength $33r$ by at least 15 nm, at least 20 nm, at least 25 nm, at least 30 nm, or at least 35 nm. In the illustrated embodiment of FIGS. 3 and 4, the first red-infrared peak wavelength $52ri$ is greater than the first red peak wavelength $33r$ by about 35 nm. Therefore, the first red-infrared transmittance peak $51ri$ and the first red emission peak $32r$ of the red light $11r$ may not substantially overlap with each other. Any substantial overlap may otherwise cause spectral ringing and may induce severe color artifacts. Hence, the backlight 200 including the optical film 40 may provide infrared transmissive and collimating functionalities while reducing or preventing the severe color artifacts.

Further, a relationship between FWri1 and FWr1 is given by: FWri1/FWr1≥7. In other words, the red-infrared full width at 70% maximum FWri1 $53ri$ is greater than the red full width at 70% maximum FWr1 $34r$ by a factor greater than or equal to 7. In some embodiments, the red-infrared full width at 70% maximum FWri1 $53ri$ is greater than the red full width at 70% maximum FWr1 $34r$ by a factor greater than about 8, greater than about 9, or greater than about 10. In other words, FWri1/FWr1 is greater than about 8, greater than about 9, or greater than about 10. In the illustrated embodiment of FIGS. 3 and 4, the ratio of the red-infrared full width at 70% maximum FWri1 $53ri$ to the red full width at 70% maximum FWr1 $34r$ is 10.7:1, i.e., FWri1/FWr1 $34r$=10.7.

The graph 400 further includes a first wavelength range 54 that is at least 10 nm wide and is disposed within 420-680 nm. In some embodiments, the first wavelength range 54 is at least 20 nm, at least 30 nm, at least 40 nm, or at least 50 nm. In the illustrated embodiment of FIG. 3, the first wavelength range 54 is 50 nm wide and is disposed within 500-550 nm.

For the substantially normally incident light 12, for the at least the first polarization state, and for the first wavelength range 54, the optical film 40, the plurality of first layers 41, and the plurality of second layers 42 have respective average optical transmittances T, T1, and T2. In the illustrated embodiment of FIG. 3, and as is apparent from the curves 50, 56a, 56b, for the substantially normally incident light 12, for the at least the first polarization state, and for the first wavelength range 54, the average optical transmittance T of the optical film 40 has a value of about 48.2%, the average optical transmittance T1 of the plurality of first layers 41 has a value of about 49.2%, and the average optical transmittance T2 of the plurality of second layers 42 has a value of about 90%.

In some embodiments, for the substantially normally incident light 12, for the at least the first polarization state, and for the first wavelength range 54, a relationship between the average optical transmittances of the optical film 40 and the plurality of first layers 41 is given by: 0.7≤T1/T≤1.3. In some embodiments, for the substantially normally incident light 12, for the at least the first polarization state, and for the first wavelength range 54, the relationship between the average optical transmittances of the optical film 40 and the plurality of first layers 41 is given by: 0.8≤T1/T≤1.2, or 0.9≤T1/T≤1.1. In the illustrated embodiment of FIG. 3, and as is apparent from the curves 50, 56a, for the substantially normally incident light 12, for the at least the first polarization state, and for the first wavelength range 54, the average optical transmittance T of the optical film 40 is substantially equal to the average optical transmittance T1 of the plurality of first layers 41. In other words, T1 is equal to T, or T1/T=1.

Therefore, for the substantially normally incident light 12, for the at least the first polarization state, and for the first wavelength range 54, the average optical transmittances of the optical film 40 and the plurality of first layers 41 are substantially equal to each other.

In some embodiments, for the substantially normally incident light 12, for the at least the first polarization state, and for the first wavelength range 54, a relationship between the average optical transmittances of the plurality of first layers 41 and the plurality of second layers 42 is given by: T1/T2≤0.9. In some embodiments, for the substantially normally incident light 12, for the at least the first polarization state, and for the first wavelength range 54, the relationship between the average optical transmittances of the plurality of first layers 41 and the plurality of second layers 42 is given by: T1/T2≤0.8, T1/T2≤0.7, or T1/T2≤0.6. In the illustrated embodiment of FIG. 3, and as is apparent from the curves 56a, 56b, for the substantially normally incident light 12, for the at least the first polarization state, and for the first wavelength range 54, a ratio of the average optical transmittance of the plurality of first layers 41 to the average optical transmittance of the plurality of second layers 42 is about 1:2. In other words, T1/T2=0.5.

Therefore, for the substantially normally incident light 12, for the at least the first polarization state, and for the first wavelength range 54, the average optical transmittance of the plurality of second layers 42 is greater than the average optical transmittance of the plurality of first layers 41.

The graph 400 further includes a second wavelength range 55 that is at least 10 nm wide and is disposed within 680-1200 nm. In some embodiments, the second wavelength range 55 is at least 20 nm, at least 30 nm, at least 40 nm, or at least 50 nm. In the illustrated embodiment of FIG. 3, the second wavelength range 55 is 50 nm wide and is disposed within 730-780 nm.

For the substantially normally incident light 12, for the at least the first polarization state, and for the second wavelength range 55, the optical film 40, the plurality of first layers 41 and the plurality of second layers 42 have respective average optical transmittances T', T1', and T2'. In the illustrated embodiment of FIG. 3, and as is apparent from the curves 50, 56a, 56b, for the substantially normally incident light 12, for the at least the first polarization state, and for the second wavelength range 55, the average optical transmittance T' of the optical film 40 has a value of about 38.1%, the average optical transmittance T1' of the plurality of first layers 41 has a value of about 90.2%, and the average optical transmittance T2' of the plurality of second layers 42 has a value of about 37.2%.

In some embodiments, for the substantially normally incident light 12, for the at least the first polarization state, and for the second wavelength range 55, a relationship between the average optical transmittances of the optical film 40 and the plurality of second layers 42 is given by:

$0.7 \leq T2'/T' \leq 1.3$. In some embodiments, for the substantially normally incident light 12, for the at least the first polarization state, and for the second wavelength range 55, the relationship between the average optical transmittances of the optical film 40 and the plurality of second layers 42 is given by: $0.8 \leq T2'/T' \leq 1.2$, or $0.9 \leq T2'/T' \leq 1.1$. In the illustrated embodiment of FIG. 3, and as is apparent from the curves 50, 56b, for the substantially normally incident light 12, for the at least the first polarization state, and for the second wavelength range 55, the average optical transmittance T' of the optical film 40 is substantially equal to the average optical transmittance T2' of the plurality of second layers 42. In other words, T2' is equal to T', or T2'/T'=1.

Therefore, for the substantially normally incident light 12, for the at least the first polarization state, and for the second wavelength range 55, the average optical transmittances of the optical film 40 and the plurality of second layers 42 are substantially equal to each other.

In some embodiments, for the substantially normally incident light 12, for the at least the first polarization state, and for the second wavelength range 55, a relationship between the average optical transmittances of the plurality of first layers 41 and the plurality of second layers 42 is given by: $T1'/T2' \geq 1.2$. In some embodiments, for the substantially normally incident light 12, for the at least the first polarization state, and for the second wavelength range 55, the relationship between the average optical transmittances of the plurality of first layers 41 and the plurality of second layers 42 is given by: $T1'/T2' \geq 1.4$, $T1'/T2' \geq 1.6$, $T1'/T2' \geq 1.8$, $T1'/T2' \geq 2$, $T1'/T2' \geq 2.1$, $T1'/T2' \geq 2.2$, or $T1'/T2' \geq 2.3$. In the illustrated embodiment of FIG. 3, and as is apparent from the curves 56a, 56b, for the substantially normally incident light 12, for the at least the first polarization state, and for the second wavelength range 55, a ratio of the average optical transmittance of the plurality of first layers 41 to the average optical transmittance of the plurality of second layers 42 is about 2.4:1. In other words, $T1'/T2'=2.4$.

Therefore, for the substantially normally incident light 12, for the at least the first polarization state, and for the second wavelength range 55, the average optical transmittance of the plurality of first layers 41 is greater than the average optical transmittance of the plurality of second layers 42.

In some embodiments, for the substantially normally incident light 12 and for the at least the first polarization state, the optical transmittance of the optical film 40 at the first red-infrared peak wavelength 52ri is Tp. In the illustrated embodiment of FIG. 4, and as is apparent from the curve 50, for the substantially normally incident light 12 and for the at least the first polarization state, the optical transmittance of the optical film 40 at the first red-infrared peak wavelength 52ri is about 59.7%. In other words, Tp=59.7%. Further, in some embodiments, T<Tp.

Therefore, for the substantially normally incident light 12 and for the at least the first polarization state, the optical transmittance of the optical film 40 at the first red-infrared peak wavelength 52ri is greater than the average optical transmittance of the optical film 40.

In some embodiments, for the substantially normally incident light 12 and for the at least the first polarization state, the optical transmittance versus wavelength of each of the pluralities of first and second layers 41, 42 includes a band edge 57a, 57b that extends across a transmission range of from at least about 35% to at most about 85%. Specifically, the optical transmittance versus wavelength of the plurality of first layers 41 includes the band edge 57a and the optical transmittance versus wavelength of the plurality of second layers 42 includes the band edge 57b. In some embodiments, for the substantially normally incident light 12 and for the at least the first polarization state, the optical transmittance versus wavelength of each of the pluralities of first and second layers 41, 42 includes the band edge 57a, 57b that extends across the transmission range of from at least about 45% to at most about 75%, from at least about 40% to at most about 80%, from at least about 35% to at most about 85%. In some embodiments, the band edges 57a, 57b intersect each other.

As shown in FIG. 3, in some embodiments, the band edges 57a, 57b intersect each other at a wavelength 57c that is within 20 nm of the first red-infrared peak wavelength 52ri. In some embodiments, the band edges 57a, 57b intersect each other at the wavelength 57c that is within about 15 nm, 20 nm, or about 5 nm of the first red-infrared peak wavelength 52ri. In the illustrated embodiment of FIG. 3, the wavelength 57c at which the band edges 57a, 57b intersect each other is about 653 nm that is within 10 nm of the first red-infrared peak wavelength 52ri (i.e., 666 nm).

Further, in some embodiments, the band edges 57a, 57b intersect each other at the wavelength 57c that is greater than the first red peak wavelength 33r by at least 10 nm. In some embodiments, the band edges 57a, 57b intersect each other at the wavelength 57c that is greater than the first red peak wavelength 33r by at least 15, at least 20, at least 25, at least 30, or at least 35 nm. In some embodiments, the band edges 57a, 57b intersect each other at the wavelength 57c that is within 40 nm of the first red peak wavelength 33r. In some embodiments, the band edges 57a, 57b intersect each other at the wavelength 57c that is within about 35 nm, about 30 nm, about 25 nm, or about 20 nm of the first red peak wavelength 33r. In the illustrated embodiment of FIG. 3, the wavelength 57c at which the band edges 57a, 57b intersect each other is about 653 nm that is that is greater than the first red peak wavelength 33r (i.e., 631 nm) by 22 nm. Therefore, the wavelength 57c is greater than the first red peak wavelength 33r by at least 10 nm and within 40 nm of the first red peak wavelength 33r.

Figure 5:
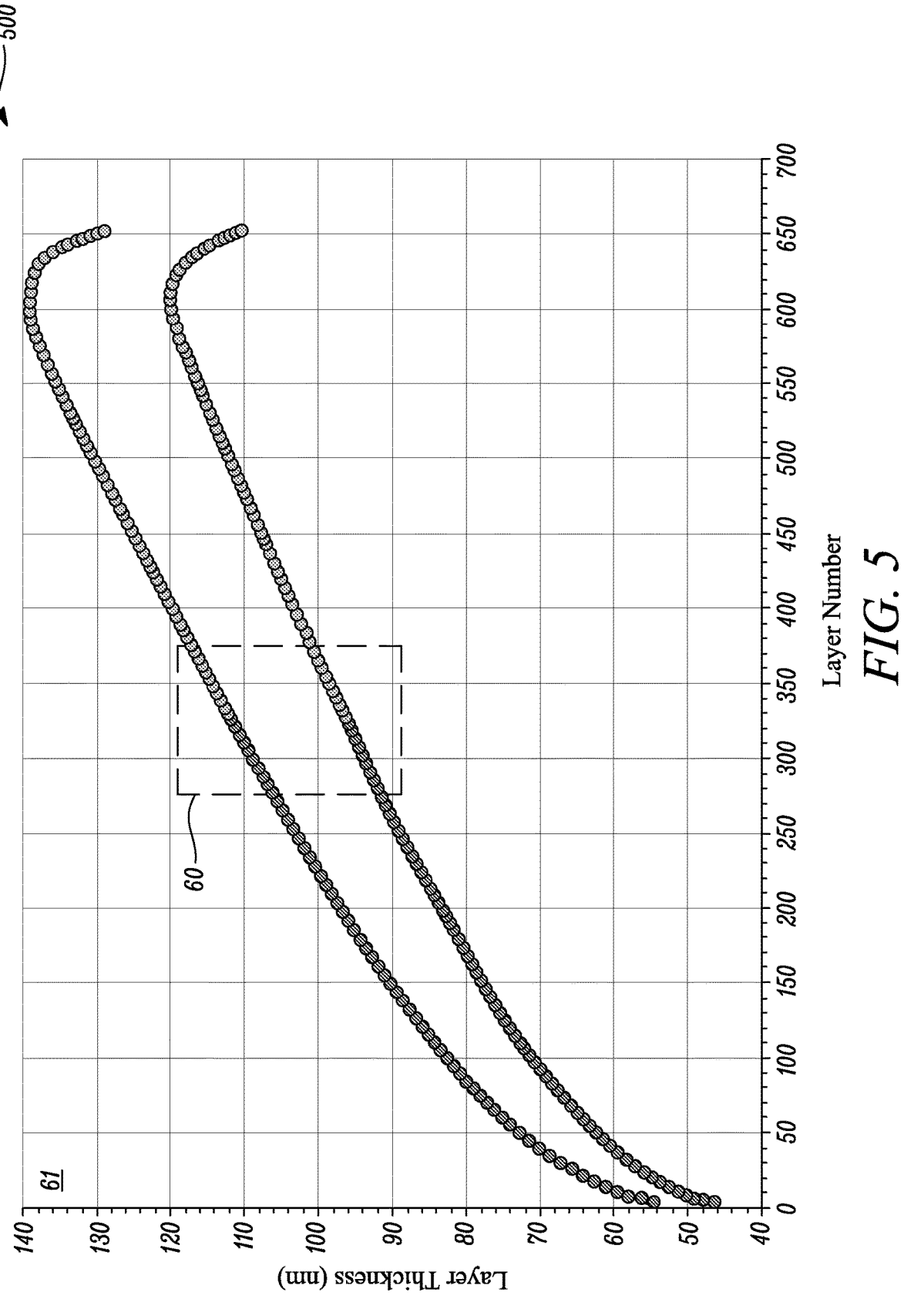
FIG. 5 shows a graph depicting a variation in a layer profile of the pluralities of first and second layers of the optical film, according to an embodiment of the present disclosure.
Figure 6:
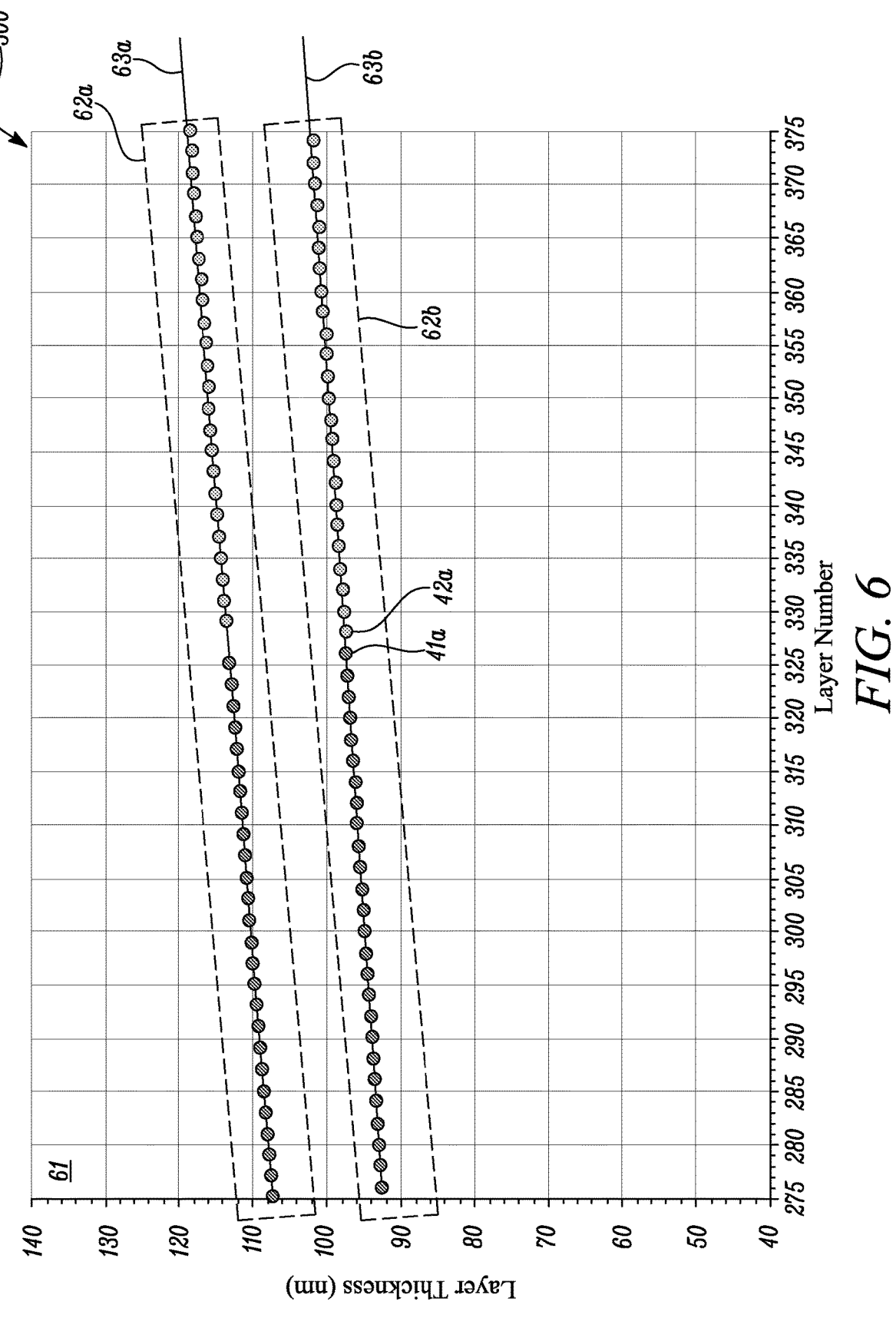
FIG. 6 shows a magnified view of a portion of the graph of FIG. 5 depicting the layer thickness versus layer number for a set of the first and second layers, according to an embodiment of the present disclosure.

FIG. 5 illustrates a graph 500 depicting a variation in a layer profile of the pluralities of first and second layers 41, 42 of the optical film 40 (shown in FIG. 2), according to an embodiment of the present disclosure. Specifically, the graph 500 depicts layer thickness versus layer number for the pluralities of first and second layers 41, 42 of the optical film 40. The layer number is expressed in the abscissa and the average layer thickness is expressed in nanometers (nm) in the ordinate. FIG. 6 illustrates the graph 500 depicting the layer thickness versus layer number for a set 60 (shown in FIG. 5) of the first and second layers 41, 42, according to an embodiment of the present disclosure.

Referring to FIGS. 1 to 6, the graph 500 includes a scatter plot 61 of the layer thickness versus layer number for at least 30 sequentially arranged and numbered first and second layers 41, 42 in the pluralities of first and second layers 41, 42.

Further, the set 60 of the first and second layers 41, 42 includes the first and second layers 41, 42 numbering at least 30 layers in total. In some embodiments, the set 60 of the first and second layers 41, 42 includes the first and second layers 41, 42 numbering at least 40 layers, at least 50 layers, at least 60 layers, at least 70 layers, at least 80 layers, at least 90 layers, or at least 100 layers in total. The set 60 of the first and second layers 41, 42 includes substantially equal numbers of the first and second layers 41, 42. In the illustrated embodiment of FIG. 5, the first and second layers 41, 42 (shown in FIG. 2) in the set 60 are sequentially numbered from 275 to 375.

Referring to FIGS. 5 and 6, in some embodiments, when for the set 60 of first and second layers 41, 42 that number at least 30 layers in total and include substantially equal numbers of the first and second layers 41, 42 including first and second layers 41a, 42a closest to one another in the optical film 40, the first and second layers 41, 42 in the set 60 being sequentially numbered from the one side 45a (shown in FIG. 2) of the optical film 40 to the opposite side 45b (shown in FIG. 2) of the optical film 40, then the scatter plot 61 of the layer thickness versus layer number for the first and second layers 41, 42 in the set 60 includes a first group 62a of scatter points and a remaining group 62b of scatter points separated along a thickness direction (i.e., along the ordinate) by at least 5 nm. In some embodiments, the first group 62a of the scatter points and the remaining group 62b of the scatter points may be separated along the thickness direction by at least 7 nm, at least 9 nm, at least 11 nm, at least 12 nm, or at least 13 nm.

Further, as is apparent from FIG. 6, the scatter points in the first and remaining groups 62a, 62b lie on respective substantially straight first and second lines 63a, 63b. In some embodiments, the substantially straight first and second lines 63a, 63b are substantially parallel.

Figure 7:
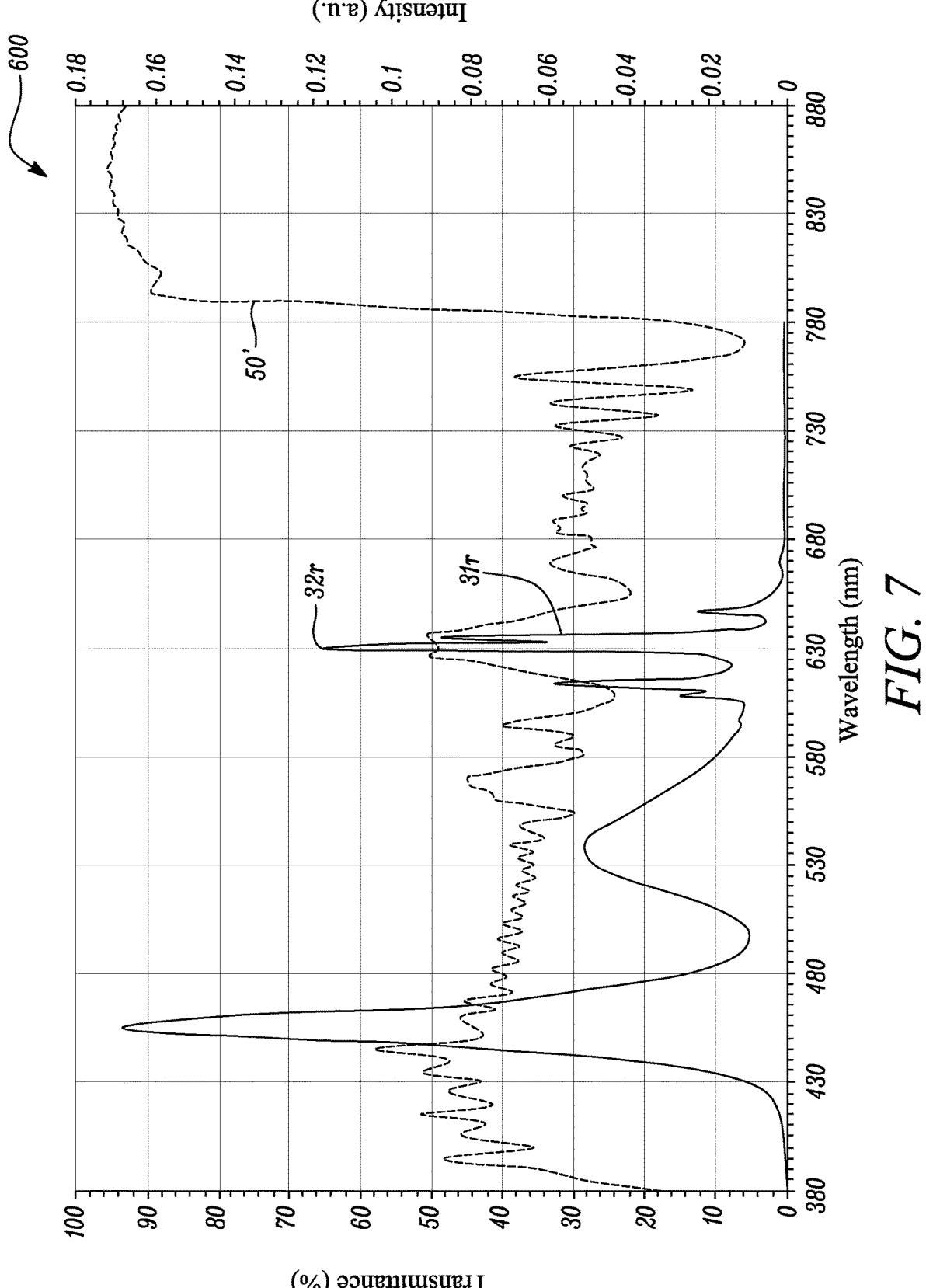
FIG. 7 shows a graph depicting an optical transmittance of the optical film for an incident light incident at an incident angle and for the at least the first polarization state, according to another embodiment of the present disclosure.
Figure 8:
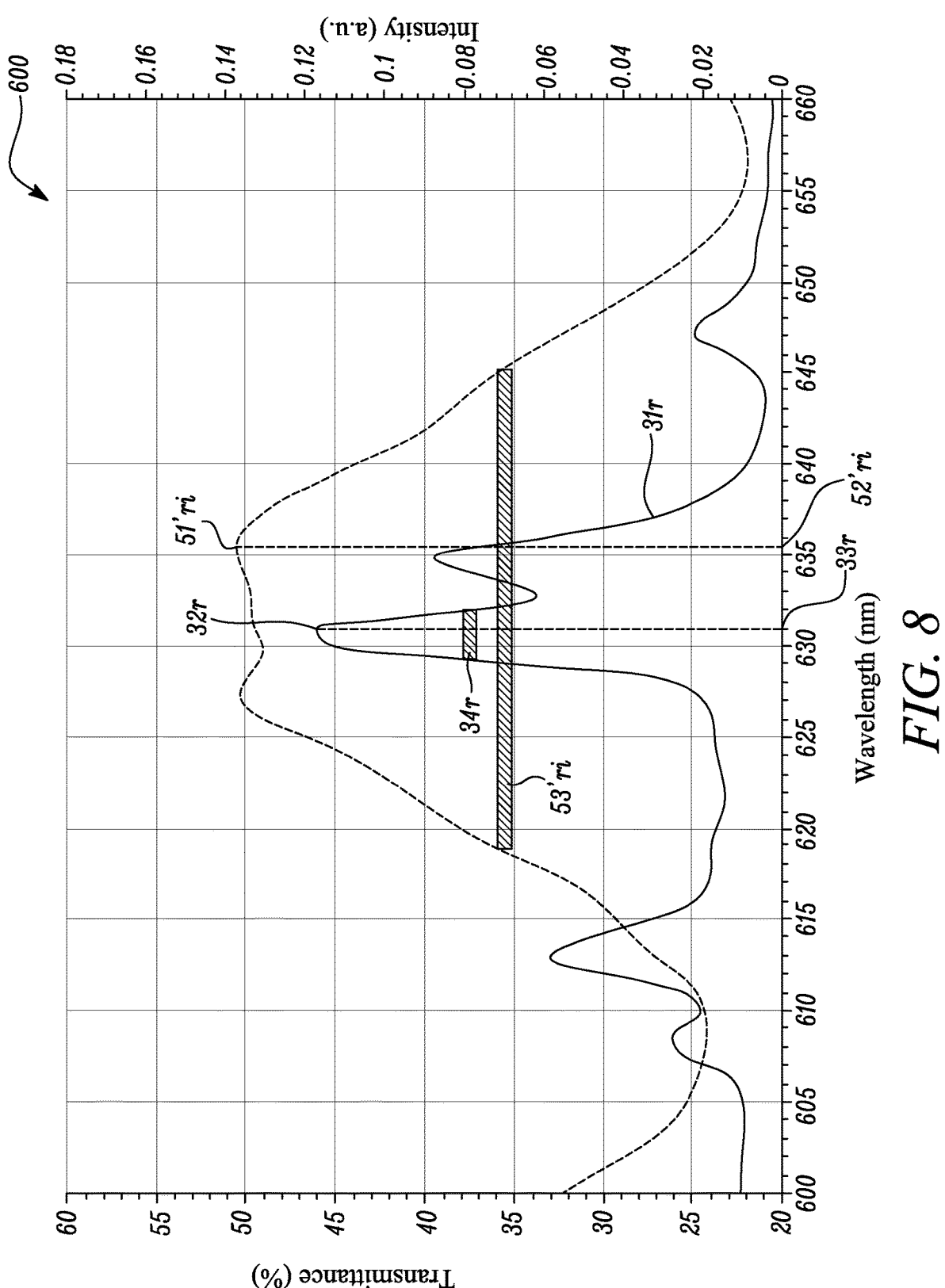
FIG. 8 shows a magnified view of a portion of the graph of FIG. 7.

FIGS. 7 and 8 illustrate a graph 600 depicting an optical transmittance of the optical film 40 (shown in FIG. 2) versus wavelength, according to an embodiment of the present disclosure. Specifically, FIG. 8 illustrates a magnified view of the graph 600 for wavelengths from 600 nm to 660 nm. In particular, the graph 600 depicts the optical transmittance of the optical film 40 versus wavelength for the incident light 13 (shown in FIG. 2) and for the at least the first polarization state.

Wavelength is expressed in nanometers (nm) in abscissa. The optical transmittance is expressed as a transmittance percentage in the left ordinate, while the emission intensity is expressed in arbitrary units (a.u.) in the right ordinate. The emission intensity in arbitrary units corresponds to the emission spectra 31b, 31g, 31r of the emitted light 11 (shown in FIG. 1) emitted by the illumination system 70 (shown in FIG. 1).

Referring to FIGS. 7 and 8, the graph 600 includes a curve 50' depicting the optical transmittance of the optical film 40 versus wavelength for the incident light 13 incident on the optical film 40 at the incident angle α1 (shown in FIG. 2) and for the at least the first polarization state. Specifically, the curve 50' depicts the optical transmittance of the optical film 40 versus wavelength for the incident light 13 incident on the optical film 40 at the incident angle α1 of about 30 degrees and for the at least the first polarization state.

Referring to FIGS. 1-2 and 7-8, as is depicted by the curve 50', for the incident light 13 incident on the optical film 40 at the incident angle α1 of greater than about 15 degrees and for the at least the first polarization state, the optical transmittance of the optical film 40 versus wavelength has a first red-infrared transmittance peak 51'ri at a first red-infrared peak wavelength 52'ri greater than about 600 nm with a red-infrared full width at 50% maximum FW'2 53'ri. The red-infrared full width at 50% maximum FW'2 is denoted by 53'ri in FIG. 8. In the illustrated embodiment of FIGS. 7 and 8, and as is apparent from the curve 50', the first red-infrared peak wavelength 52'ri is about 635.5 nm and the red-infrared full width at 50% maximum FW'2 53'ri is about 36 nm.

The red-infrared full width at 50% maximum FW'2 53'ri of the first red-infrared peak wavelength 52'ri fully encompasses the red full width at 70% maximum FWr1 34r of the first red peak wavelength 33r. Further, a relation between the red-infrared full width at 50% maximum FW'2 53'ri and the red full width at 70% maximum FWr1 34r is given by: FW'2/FWr1≥2. In some embodiments, the relation between the red-infrared full width at 50% maximum FW'2 53'ri and the red full width at 70% maximum FWr1 34r is given by: FW'2/FWr1≥3, FW'2/FWr1≥4, FW'2/FWr1≥5, FW'2/FWr1≥6, FW'2/FWr1≥7, FW'2/FWr1≥8, FW'2/FWr1≥9, FW'2/FWr1≥10, FW'2/FWr1≥11, FW'2/FWr1≥15, or FW'2/FWr1≥20. In the illustrated embodiment of FIGS. 7 and 8, a ratio of the red-infrared full width at 50% maximum FW'2 53'ri to the red full width at 70% maximum FWr1 34r is about 12:1.

In some embodiments, the optical transmittance of the optical film 40 at the first red-infrared transmittance peak 51'ri is less than about 80%. In some embodiments, the optical transmittance of the optical film 40 at the first red-infrared transmittance peak 51'ri is less than about 75%, less than about 70%, less than about 65%, less than about 60%, less than about 55%, or less than about 50%. In the illustrated embodiment of FIGS. 7 and 8, the optical transmittance of the optical film 40 at the first red-infrared transmittance peak 51'ri is about 51%.

Figure 9:
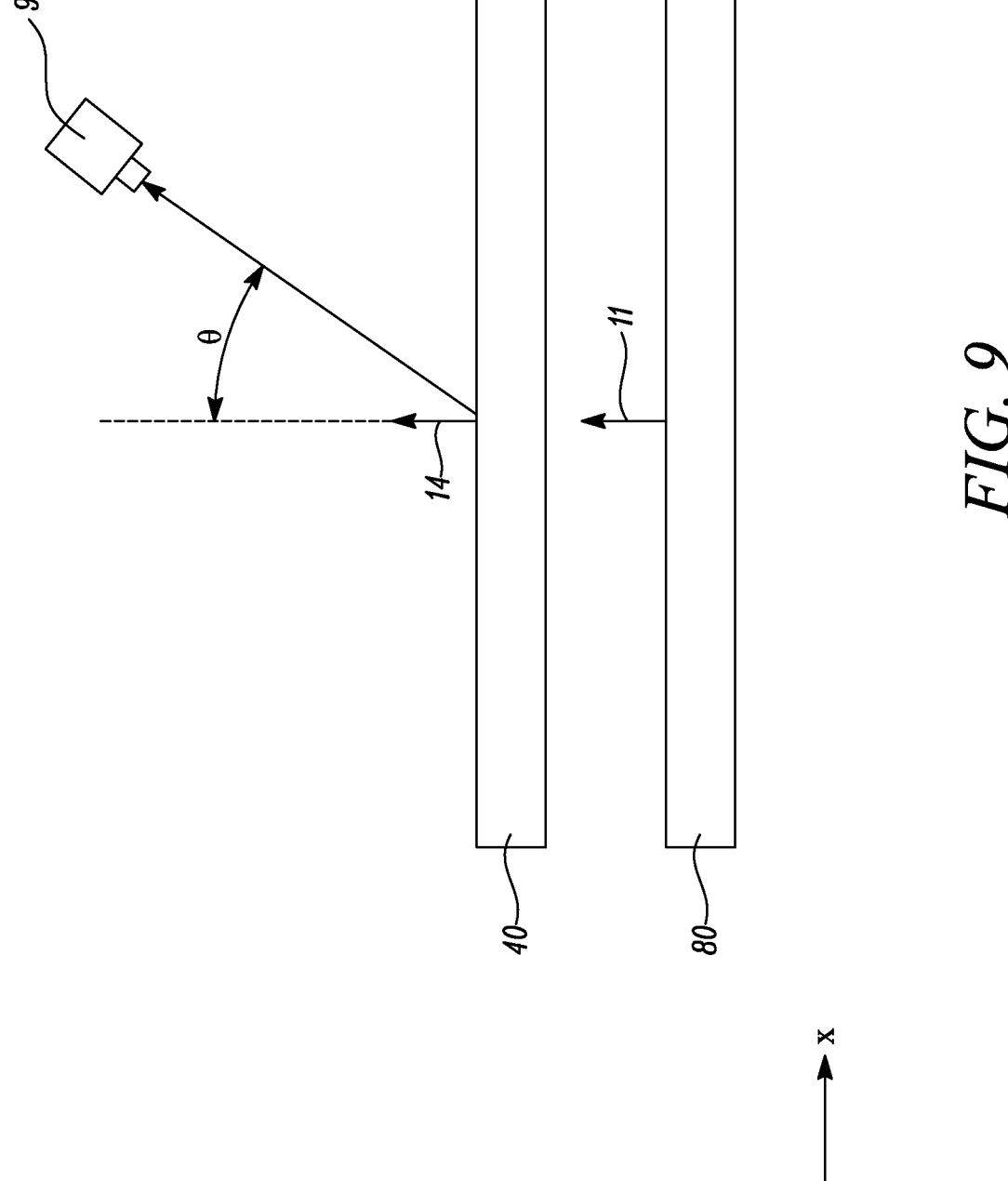
FIG. 9 shows a schematic view of a substantially Lambertian light source and the optical film, according to an embodiment of the present disclosure.

FIG. 9 illustrates a schematic view of a substantially Lambertian light source 80 and the optical film 40, according to an embodiment of the present disclosure.

Referring to FIGS. 1-4 and 9, the optical film 40 is disposed on the substantially Lambertian light source 80. The substantially Lambertian light source 80 emits the light 11 towards the optical film 40. Specifically, the substantially Lambertian light source 80 emits light 11 having the respective blue, green, and red emission spectra 31b, 31g, 31r including the respective blue, green, and red peaks 32b, 32g, 32r with the respective blue, green, and red full width at 70% maximums FWb1, FWg1, and FWr1 34b, 34g, 34r, respectively.

When the substantially Lambertian light source 80 emits the light 11, then the optical film 40 transmits the emitted light 11 as a transmitted light 14. The optical film 40 transmits the emitted light 11 with a color shift 90v, 90h (shown in FIG. 10) of the transmitted light 14 with respect to the light emitted that varies as a function of a transmitted angle θ in a plane substantially perpendicular to the optical film 40. In some embodiments, the plane is the x-z plane. In some other embodiments, the plane is y-z plane.

Figure 10:
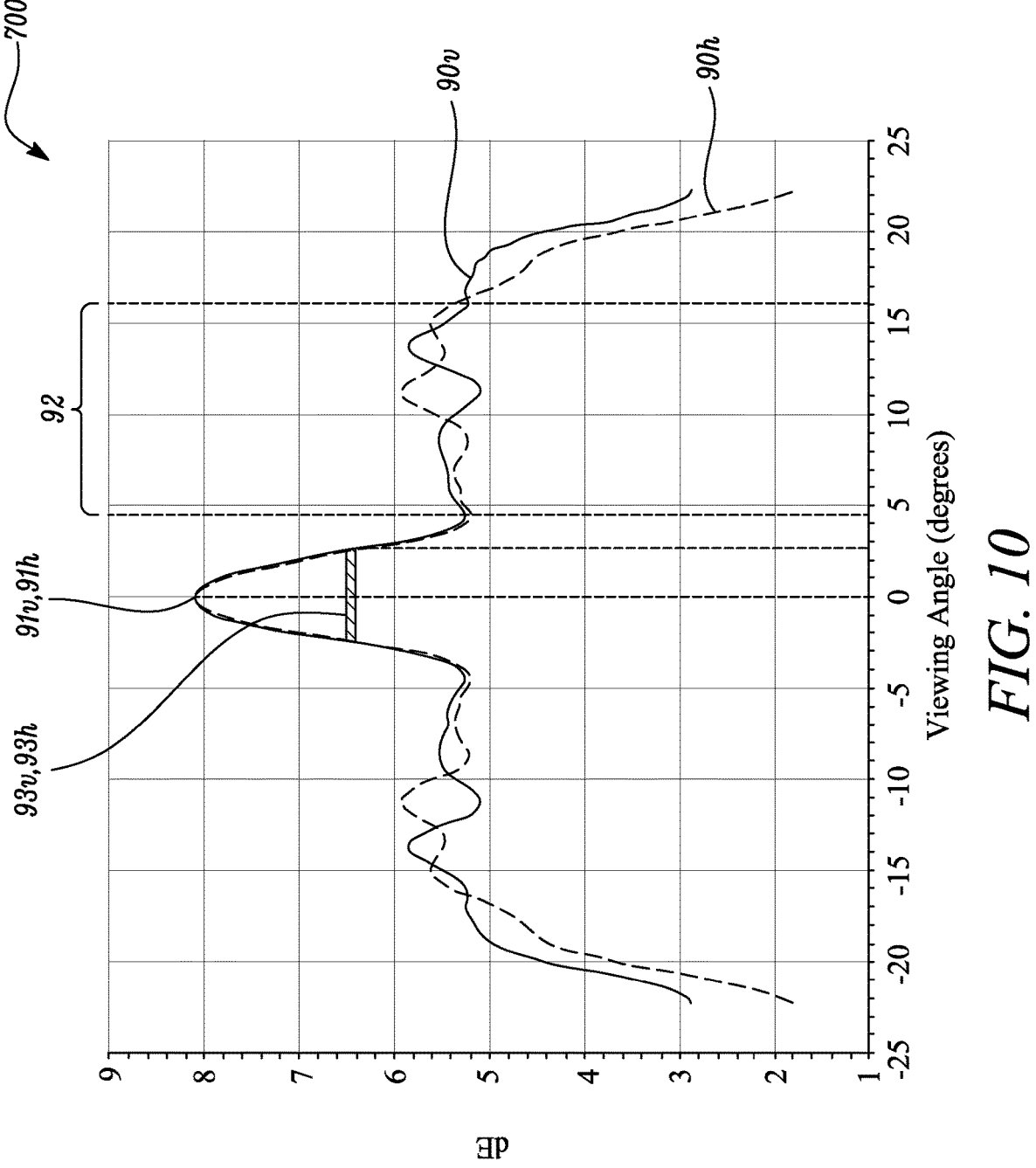
FIG. 10 shows a graph depicting a color shift of a transmitted light, with respect to the light emitted, as a function of a transmitted angle in a plane substantially perpendicular to the optical film, according to an embodiment of the present disclosure.

FIG. 9 further illustrates an optical detector 94 configured to detect at least a portion of the transmitted light 14 exiting the optical film 40. FIG. 10 illustrates a graph 700 depicting the color shift 90v, 90h of the transmitted light 14, with respect to the light emitted, as the function of the transmitted angle θ in the plane substantially perpendicular to the optical film 40. Specifically, the color shift 90v of the transmitted light 14 with respect to the light emitted is depicted as a the function of the transmitted angle θ in the x-z plane, and the color shift 90h of the transmitted light 14 with respect to the light emitted is depicted as a the function of the transmitted angle θ in the y-z plane. Viewing angles is expressed in degrees in abscissa. Color shift (dE) is expressed in ordinate. The color shift is calculated based on a Lambertian light source (e.g., the Lambertian light source 80) with D65 spectral standard. The color space used is CIE LAB. For each viewing angle, the LAB color coordinate is evaluated. To compute the final color shift for each viewing angle, the average color point of all viewing angles is used as a reference. The equation for color shift is provided below.

$$\text{Color shift}\,(dE) = \sqrt{\left(L - \bar{L}\right)^2 + \left(A - \bar{A}\right)^2 + \left(B - \bar{B}\right)^2}$$

where L, A, B are the LAB color coordinates of each viewing angle; and $\bar{L}$, $\bar{A}$, $\bar{B}$ are the average color point of all viewing angles.

Referring to FIGS. 9 and 10, the color shift 90v, 90h has a main color shift peak 91v, 91h at a transmission angle of less than about 10 degrees. Specifically, the color shift 90v has the main color shift peak 91v at the transmission angle of less than about 10 degrees and the color shift 90h has the main color shift peak 91h at the transmission angle of less than about 10 degrees. In the illustrated embodiment of FIG. 10, the color shift 90v, 90h has the main color shift peak 91v, 91h at the transmission angle of about 0 degree. In some embodiments, the color shift 90v, 90h has the main color shift peak 91v, 91h at the transmission angle of less than about 7 degrees, less than about 6 degrees, less than about 5 degrees, less than about 4 degrees, less than about 3 degrees, less than about 2 degrees, or less than about 1 degree.

The color shift 90v, 90h further has a color shift plateau region 92 that is at least 5 degrees wide and lies at the transmission angles of greater than about 2 degrees. In the illustrated embodiment of FIG. 10, the color shift plateau region 92 is about 16 degrees wide. In some embodiments, the color shift plateau region 92 is at least 7 degrees, at least 9 degrees, at least 10 degrees, at least 12 degrees, at least 15 degrees, at least 17 degrees, at least 19 degrees, or at least 20 degrees wide. In some embodiments, the color shift plateau region 92 lies at the transmission angles of greater than about 3 degrees, greater than about 4 degrees, or greater than about 5 degrees.

Further, the main color shift peak 91v, 91h has a full width at 80% maximum 93v, 93h of greater than about 1 degree. Specifically, the main color shift peak 91v has the full width at 80% maximum 93v of greater than about 1 degree and the main color shift peak 91h has the full width at 80% maximum 93h of greater than about 1 degree. In the illustrated embodiment of FIG. 10, each of the main color shift peaks 91v, 91h has the respective full width at 80% maximum 93v, 93h of about 5 degrees. In some embodiments, the main color shift peak 91v, 91h has the full width at 80% maximum 93v, 93h of greater than about 1.5 degrees, greater than about 2 degrees, greater than about 2.5 degrees, greater than about 3 degrees, greater than about 3.5 degrees, greater than about 4 degrees, greater than about 4.5 degrees, or greater than about 5 degrees.

The color shift 90v, 90h across the color shift plateau region 92 varies with a standard deviation of less than about 0.5. In the illustrated embodiment of FIG. 10, the color shift 90v across the color shift plateau region 92 varies with a standard deviation of about 0.20016. Further, the color shift 90h across the color shift plateau region 92 varies with a standard deviation of about 0.21127. In some embodiments, the color shift 90v, 90h across the color shift plateau region 92 varies with the standard deviation of less than about 0.45, less than about 0.4, less than about 0.35, less than about 0.3, less than about 0.25, or less than about 0.2.

Figure 11:
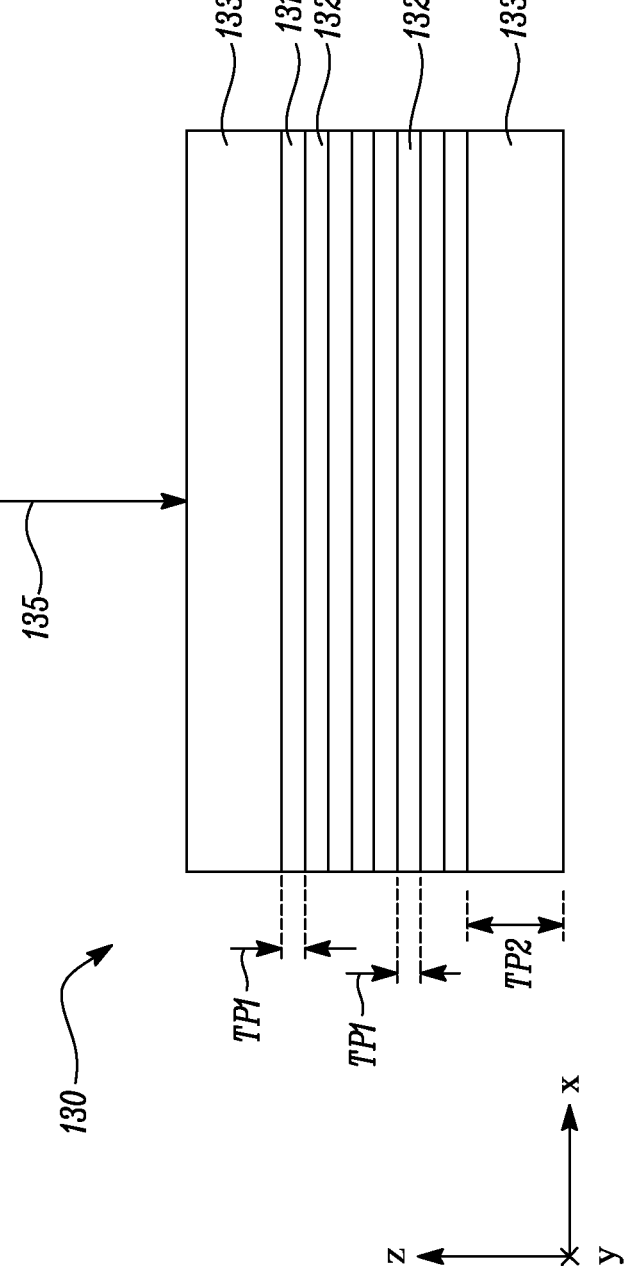
FIG. 11 shows a schematic view of a reflective polarizer, according to an embodiment of the present disclosure.

FIG. 11 illustrates a schematic view of the reflective polarizer 130, according to an embodiment of the present disclosure. The reflective polarizer 130 includes a plurality of polymeric layers 131, 132 numbering at least 10 in total. In some embodiments, the reflective polarizer 130 includes the plurality of polymeric layers 131, 132 numbering at least 20, at least 50, at least 75, at least 100, at least 150, at least 200, at least 250, at least 300, or at least 400 in total. In some embodiments, the plurality of polymeric layers 131, 132 is arranged in an alternating manner. Each of the polymeric layers 131, 132 has an average thickness TP1 of less than about 500 nm. In some embodiments, each of the polymeric layers 131, 132 has the average thickness TP1 of less than about 400 nm, less than about 350 nm, less than about 300 nm, less than about 250 nm, or less than about 200 nm.

In some embodiments, the reflective polarizer 130 further includes at least one skin layer 133 having an average thickness TP2 of greater than about 500 nm. In some embodiments, the at least one skin layer 133 has the average thickness TP2 of greater than about 750 nm, greater than 1000 nm, greater than about 1500 nm, or greater than about 2000 nm. In the illustrated embodiment of FIG. 11, the reflective polarizer 130 includes two skin layers 133. The at least one skin layer 133 may protect the polymeric layers 131, 132, and may also provide mechanical stability to the reflective polarizer 130. In some cases, the at least one skin layer 133 may act as protective boundary layer (PBL).

In some embodiments, for a substantially normally incident light 135 and at least one wavelength in a visible range extending from about 420 nm to about 680 nm, the plurality of the polymeric layers 131, 132 reflects more than about 60% of the incident light 135 having an in-plane first polarization state and transmits more than about 60% of the incident light 135 having an in-plane orthogonal second polarization state. In some embodiments, the in-plane first polarization state is along the x-axis and the in-plane second polarization state is along the y-axis.

In some embodiments, for the substantially normally incident light 135 and the at least one wavelength in the visible range extending from about 420 nm to about 680 nm, the plurality of the polymeric layers 131, 132 reflects more than about 70%, more than about 80%, or more than about 90% of the incident light 135 having the in-plane first polarization state and transmits more than about 70%, more than about 80%, or more than about 90% of the incident light 135 having the in-plane second polarization state.

Figure 12:
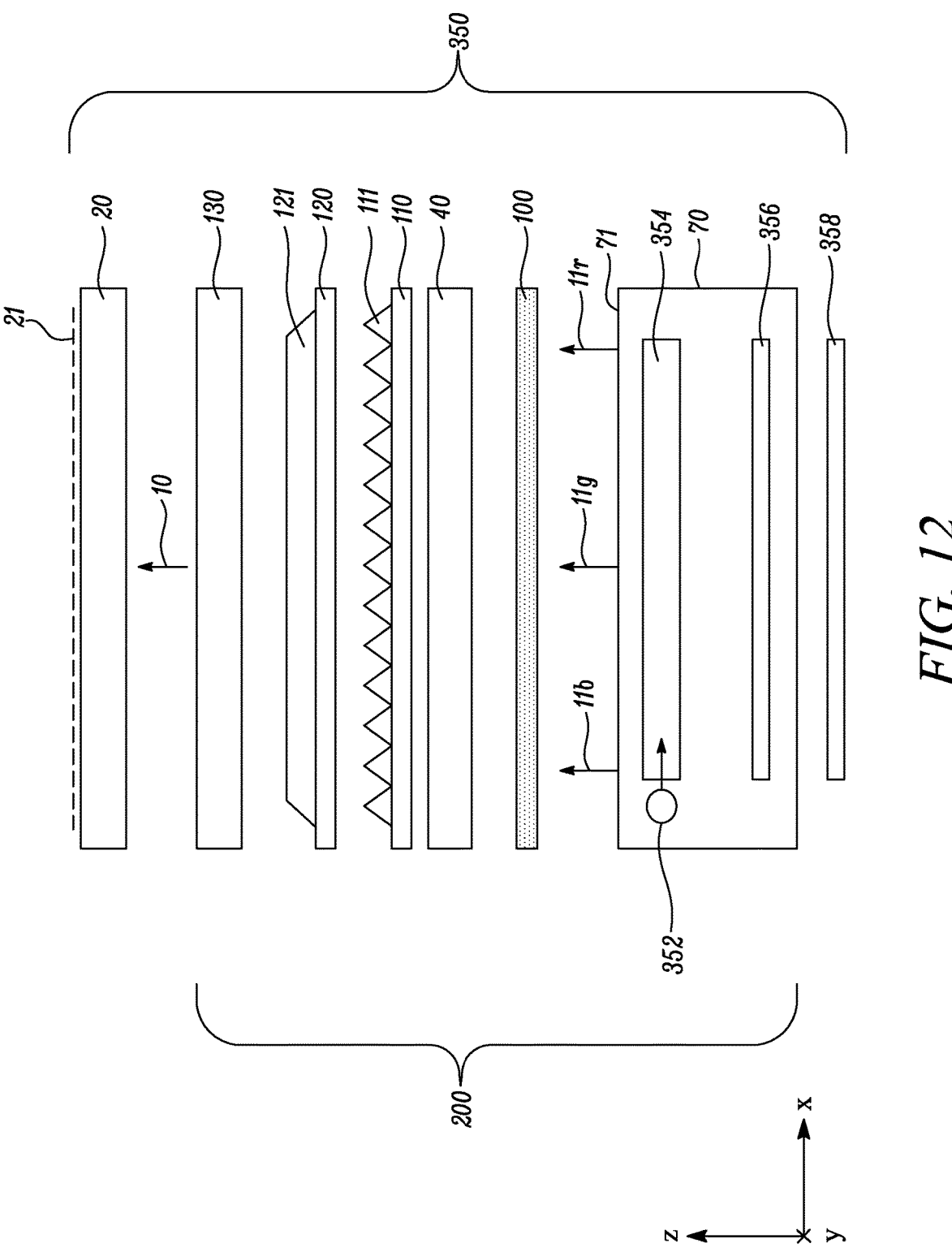
FIG. 12 shows a schematic sectional exploded view of a display system, according to another embodiment of the present disclosure.

FIG. 12 shows a schematic sectional exploded view of a display system 350, according to another embodiment of the present disclosure. The display system 350 is substantially similar to the display system 300. However, in the illustrated embodiment of FIG. 12, the illumination system 70 has an edge lit configuration. Specifically, the illumination system 70 of the display system 350 includes at least one light emitting element 352 disposed at an edge of the illumination system 70. The at least one light emitting element 352 includes the red light emitting elements 30r (shown in FIG. 1). In some embodiments, the at least one light emitting element 352 further includes the blue light emitting elements 30b (shown in FIG. 1) and the green light emitting elements 30g (shown in FIG. 1).

Further, in some embodiments, the illumination system 70 further includes a lightguide 354 for propagating a light emitted by the at least one light emitting element 352 along a length and a width of the lightguide 354. The light emitted by the at least one light emitting element 352 may enter the lightguide 354 from a side of the lightguide 354. In some embodiments, the lightguide 354 is a solid lightguide. In some embodiments, the lightguide 354 is a substantially hollow lightguide. In some embodiments, the lightguide 354 may be a step wedge lightguide.

In some embodiments, the illumination system 70 further includes a reflector 356 for at least redirecting the light emitted by the at least one light emitting element 352. In some embodiments, the reflector 356 includes a metal layer (not shown). In some embodiments, the metal layer includes one or more of silver, gold, aluminum, and titanium. In some embodiments, the reflector 356 includes a multilayer optical film that reflects visible light but transmits infra-red light.

In some embodiments, the display system 350 further includes an infrared sensor 358 disposed proximate the backlight 200. In some embodiments, the infrared sensor 358 may be configured to obtain an image of an object (e.g., to detect a fingerprint) proximal to the display system 350. A display device (e.g., a mobile phone) including the display system 350 may be configured to determine if the image matches a predetermined image (e.g., an image of a fingerprint of an authorized user).

In some embodiments, the infrared sensor 358 includes one or more of an array of photodiodes, a charged coupled device (CCD), a charge injection device (CID), a photodiode, an organic photodiode, a complementary metal-oxide-semiconductor (CMOS), and a thin-film transistor (TFT).

In some embodiments, the lightguide 354 may use total internal reflection (TIR) to transport or guide a light incident on the lightguide 354 towards the reflector 356. In some cases, the lightguide 354 may improve uniformity of the light that may be incident on the reflector 356. The lightguide 354 may be configured to guide the light towards the reflector 356. At least a portion of the light may be reflected by the reflector 356 as a reflected light. Particularly, the reflector 356 is configured to substantially reflect a portion of the light having wavelength in a visible wavelength range extending from about 420 nm to about 680 nm, as the reflected light toward the emission surface 71. Further, the reflector 356 is configured to substantially transmit a portion of the light having wavelength in an infrared range extending from about 700 nm to about 1000 nm toward the infrared sensor 358.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A backlight for providing illumination to a display panel configured to display an image, the backlight comprising:

an illumination system including red light emitting elements and configured to emit a light from an emission surface thereof, the emitted light comprising at least a red light comprising a red emission spectrum comprising a first red emission peak at a first red peak wavelength with a red full width at 70% maximum FWr1; and an optical film disposed on the red light emitting elements and comprising a plurality of first layers, a plurality of second layers, and at least one spacer layer disposed between the plurality of first layers and the plurality of second layers, the first and second layers numbering at least 10 in total, each of the first and second layers having an average thickness of less than about 500 nanometers (nm), each of the at least one spacer layer having an average thickness of at least about 5 microns, such that for a substantially normally incident light and for at least a first polarization state, an optical transmittance of the optical film versus wavelength has a first red-infrared transmittance peak at a first red-infrared peak wavelength of greater than about 600 nm with a red-infrared full width at 70% maximum FWri1, wherein the first red-infrared peak wavelength is greater than the first red peak wavelength by at least 10 nm, and wherein FWri1/FWr1≥7.

2. The backlight of claim 1, wherein the illumination system includes blue light emitting elements and green light emitting elements, wherein the emitted light from the emission surface of the illumination system further comprises a blue light having a blue emission spectrum comprising a first blue emission peak at a first blue peak wavelength with a blue full width at 70% maximum FWb1, and a green light having a green emission spectrum comprising a first green emission peak at a first green peak wavelength with a green full width at 70% maximum FWg1, and wherein each of FWb1 and FWg1 is greater than FWr1 by at least a factor of 2.

3. The backlight of claim 1, wherein for a set of the first and second layers that number at least 30 layers in total and include substantially equal numbers of the first and second layers including the first and second layers closest to one another in the optical film, the first and second layers in the set being sequentially numbered from one side of the optical film to an opposite side of the optical film, a scatter plot of layer thickness versus layer number for the first and second layers in the set includes a first group of scatter points and a remaining group of scatter points separated along a thickness direction by at least 5 nm, wherein the scatter points in the first and remaining groups lie on respective substantially straight first and second lines.

4. The backlight of claim 1, wherein for the substantially normally incident light, for the at least the first polarization state, and for a first wavelength range that is at least 10 nm wide and is disposed within 420-680 nm, the optical film, the plurality of first layers, and the plurality of second layers have respective average optical transmittances T, T1, and T2, $0.7 \leq T1/T \leq 1.3$, $T1/T2 \leq 0.9$.

5. The backlight of claim 1, wherein for the substantially normally incident light, for the at least the first polarization state, and for a second wavelength range that is at least 10 wide and is disposed within 680-1200 nm, the optical film, the plurality of first layers, and the plurality of second layers have respective average optical transmittances T', T1', and T2', $0.7 \leq T2'/T' \leq 1.3$, $T1'/T2' \geq 1.2$.

6. The backlight of claim 1, wherein for the substantially normally incident light and for the at least the first polarization state, the optical transmittance of the optical film at the first red-infrared peak wavelength is Tp, and an average optical transmittance of the optical film in a first wavelength range that is at least 10 nm wide and is disposed within 420-680 nm is T, $T < Tp$.

7. The backlight of claim 1 further comprising a reflective polarizer disposed on the optical film opposite the illumination system and comprising a plurality of polymeric layers numbering at least 10 in total, each of the polymeric layers having an average thickness of less than about 500 nm, such that for a substantially normally incident light and at least one wavelength in a visible range extending from about 420 nm to about 680 nm, the plurality of the polymeric layers reflects more than about 60% of the incident light having an in-plane first polarization state and transmits more than about 60% of the incident light having an in-plane orthogonal second polarization state.

8. A display system comprising a display panel disposed on the backlight of claim 1 and configured to receive illumination from the backlight and display an image.

9. The backlight of claim 1, wherein for the substantially normally incident light and for the at least the first polarization state, an optical transmittance versus wavelength of each of the pluralities of first and second layers comprises a band edge that extends across a transmission range of from at least about 35% to at most about 85%, wherein the band edges intersect each other.

10. The backlight of claim 9, wherein the band edges intersect each other at a wavelength that is within 20 nm of the first red-infrared peak wavelength.

11. The backlight of claim 9, wherein the band edges intersect each other at a wavelength that is greater than the first red peak wavelength by at least 10 nm.

12. The backlight of claim 9, wherein the band edges intersect each other at a wavelength that is within 40 nm of the first red peak wavelength.

13. A backlight for providing illumination to a display panel configured to display an image, the backlight comprising:

an illumination system comprising red light emitting elements and configured to emit a light from an emission surface thereof, the emitted light comprising at least a red light comprising a red emission spectrum comprising a first red emission peak at a first red peak wavelength with a red full width at 70% maximum FWr1; and an optical film disposed on the red light emitting elements and comprising a plurality of first layers, a plurality of second layers, and at least one spacer layer disposed between the plurality of first layers and the plurality of second layers, the first and second layers numbering at least 10 in total, each of the first and second layers having an average thickness of less than about 500 nm, each of the at least one spacer layer having an average thickness of at least about 5 microns, such that for an incident light incident on the optical film at an incident angle of greater than about 15 degrees and for at least a first polarization state, an optical transmittance of the optical film versus wavelength has a first red-infrared transmittance peak at a first red-infrared peak wavelength greater than about 600 nm with a red-infrared full width at 50% maximum FW'2, wherein the red-infrared full width at 50% maximum FW'2 of the first red-infrared peak wavelength fully encompasses the red full width at 70% maximum FWr1 of The first red peak wavelength, and FW'2/FWr1≥2.

14. The backlight of claim 13, wherein the optical transmittance of the optical film at the first red-infrared transmittance peak is less than about 80%.

15. An optical film comprising a plurality of first layers, a plurality of second layers, and at least one spacer layer disposed between the plurality of first layers and the plurality of second layers, the first and second layers numbering at least 50 in total, each of the first and second layers having an average thickness of less than about 500 nm, each of the at least one spacer layer having an average thickness of at least about 5 microns, wherein a scatter plot of layer thickness versus layer number for at least 30 sequentially arranged and numbered first and second layers in the pluralities of first and second layers comprises a first group of scatter points and a remaining group of scatter points separated along a thickness direction, wherein the scatter points in the first and remaining groups lie on respective substantially straight first and second lines, such that when the optical film is disposed on a substantially Lambertian light source that emits light having respective blue, green, and red emission spectra comprising respective blue, green, and red peaks with respective blue, green, and red full width at 70% maximums FWb1, FWg1, and FWr1, respectively, where FWb1 is greater than FWr1 by at least a factor of 2, and FWg1 is greater than FWr1 by at least a factor of 5, then the optical film transmits the emitted light with a color shift of the transmitted light with respect to the light emitted and as a function of a transmitted angle in a plane substantially perpendicular to the optical film, having a main color shift peak at a transmission angle of less than about 10 degrees and a color shift plateau region that is at least 5 degrees wide and lies at transmission angles of greater than about 2 degrees, the main color shift peak having a full width at 80% maximum of greater than about 1 degree, and the color shift across the color shift plateau region varying with a standard deviation of less than about 0.5.

\* \* \* \* \*